Feb. 12, 1963   M. VANDER LAAN ET AL   3,077,270
CONVEYOR SYSTEM FOR CARGO VESSEL
Filed Oct. 28, 1959   13 Sheets-Sheet 10

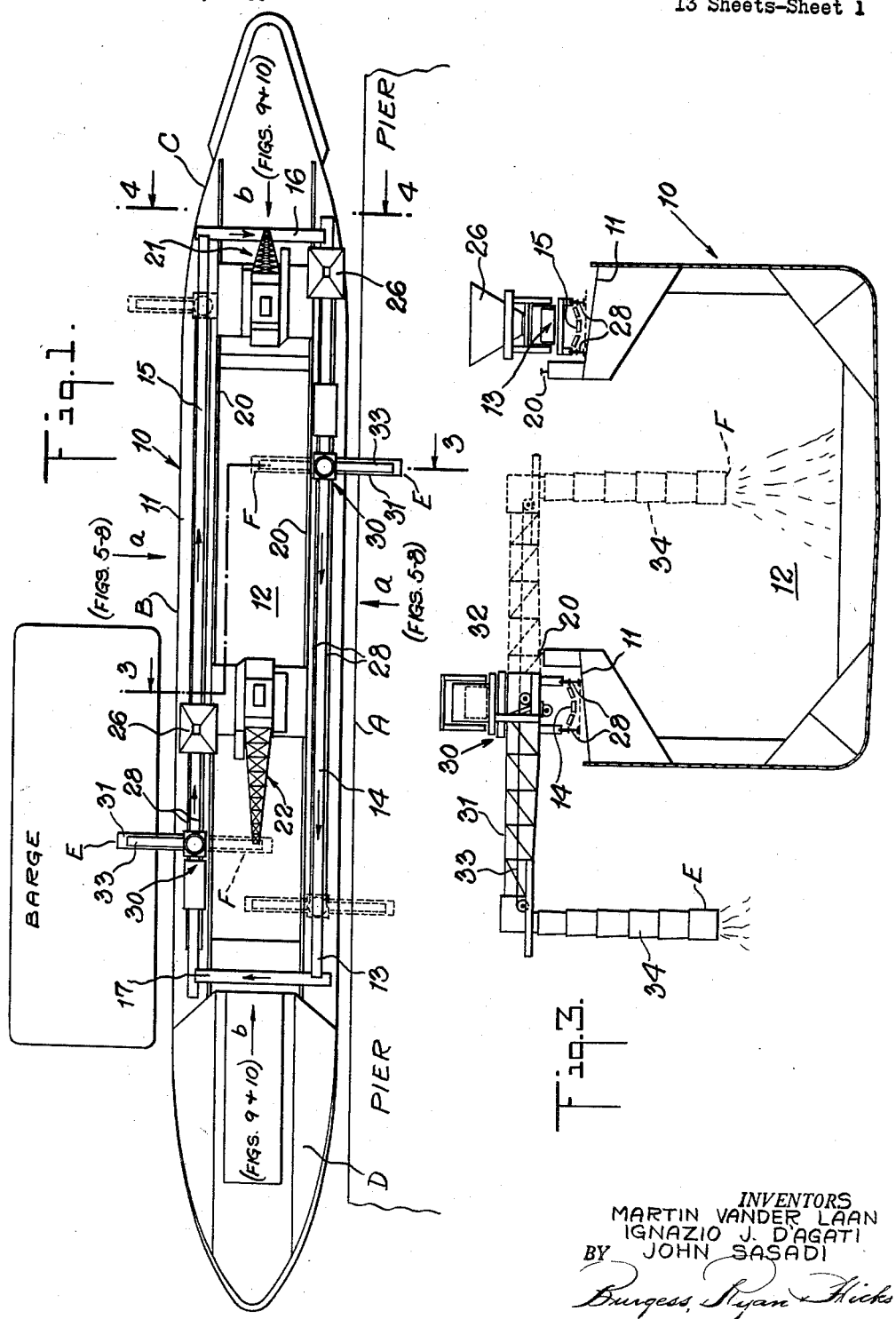

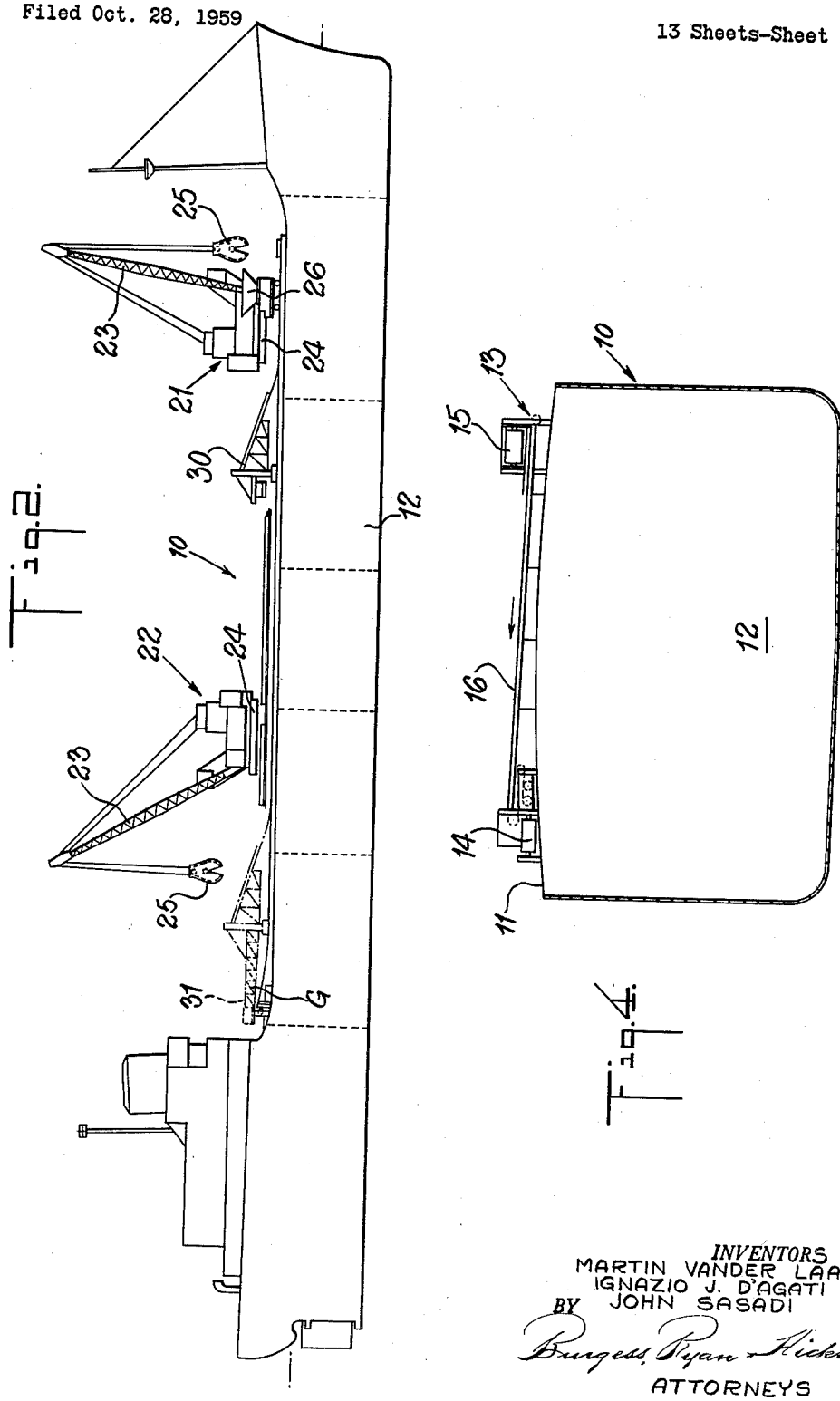

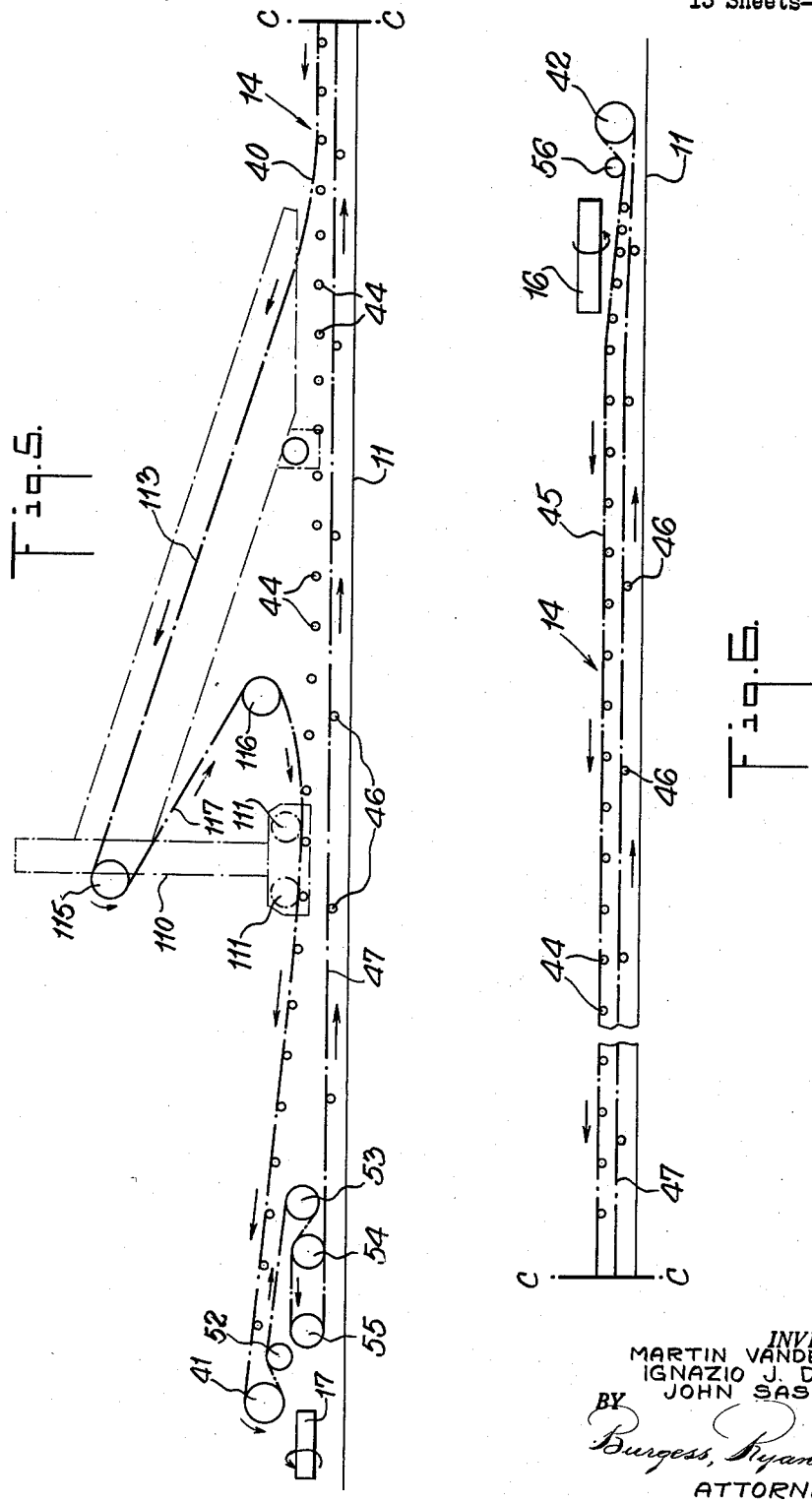

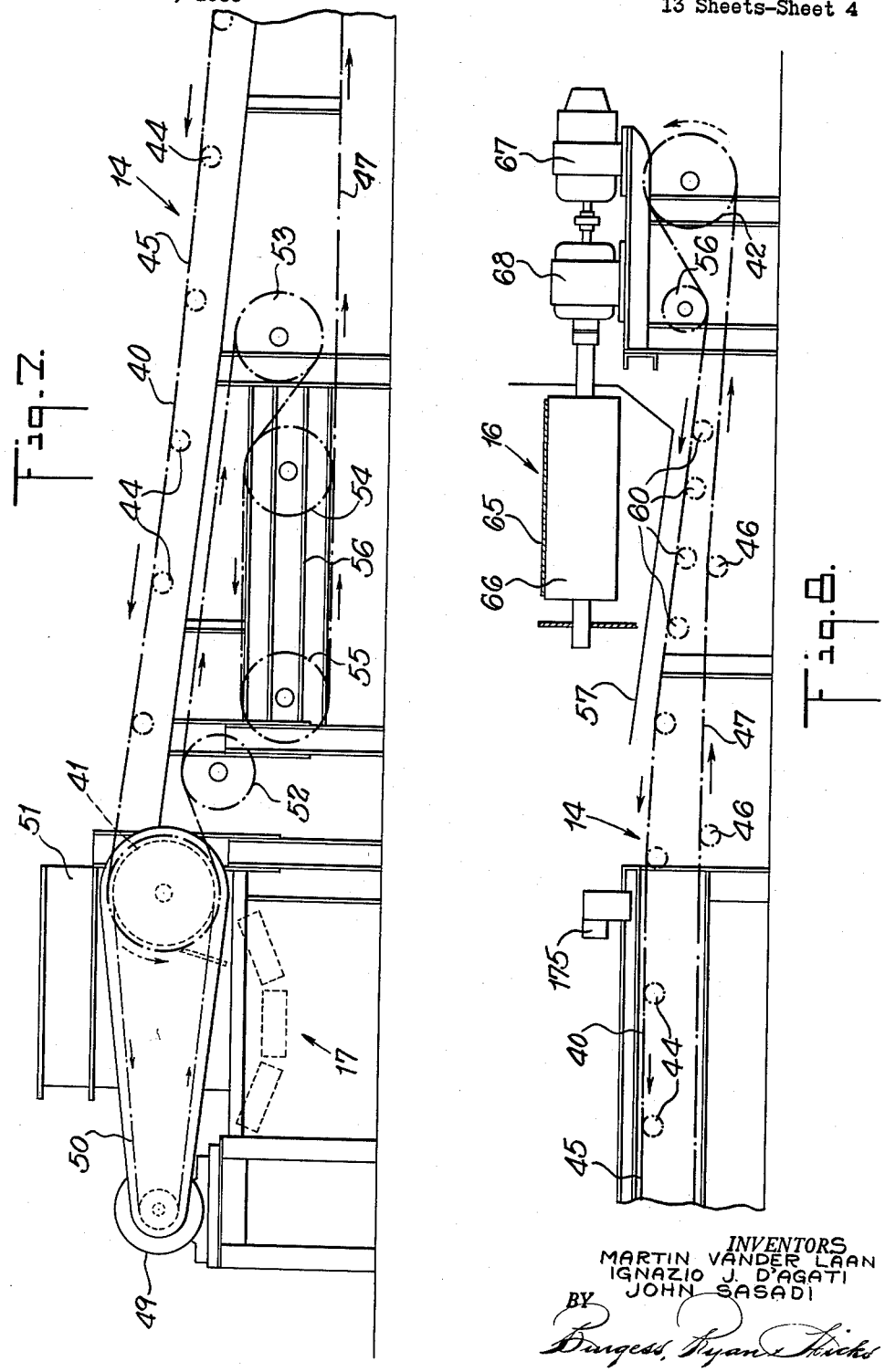

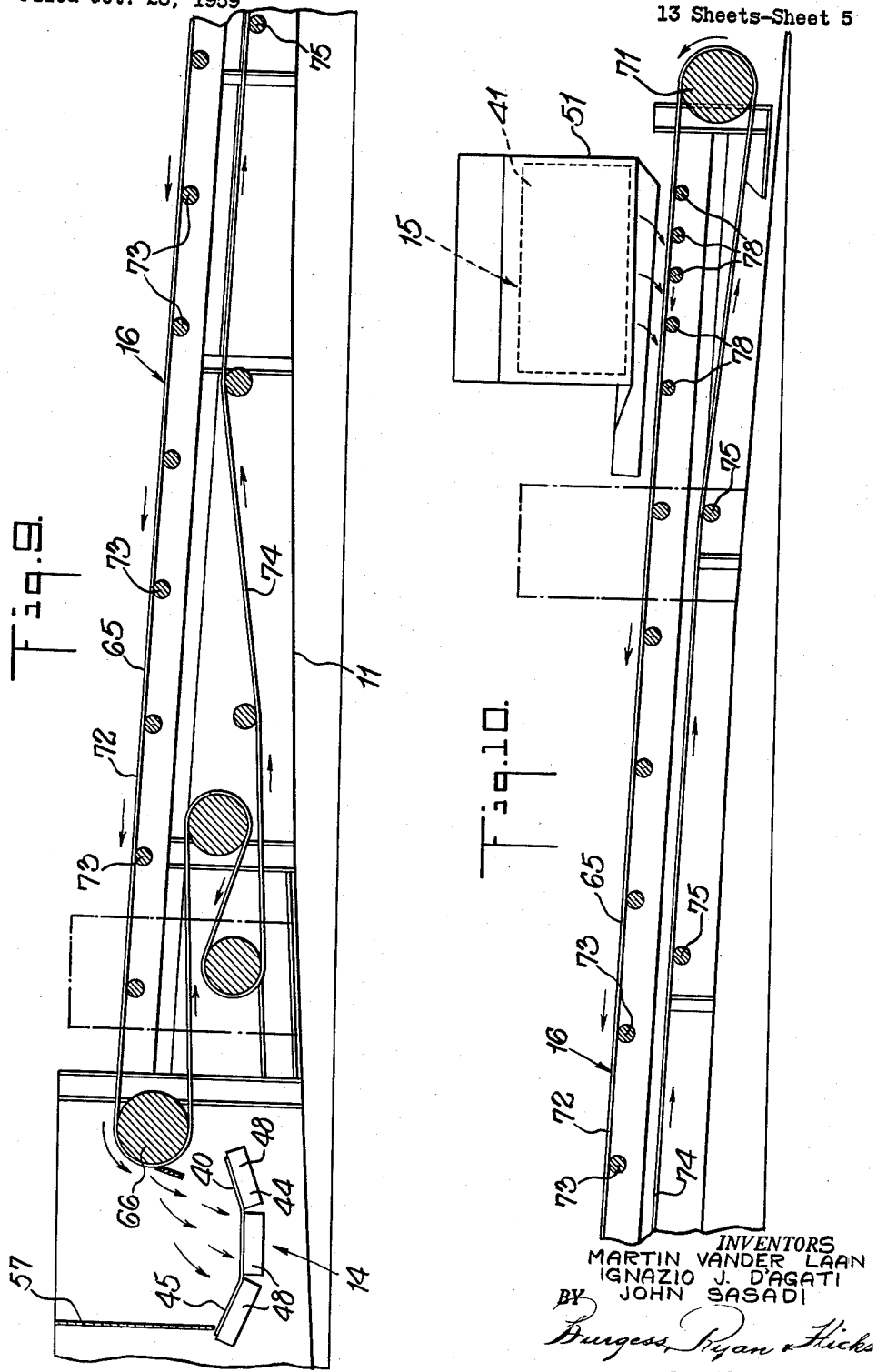

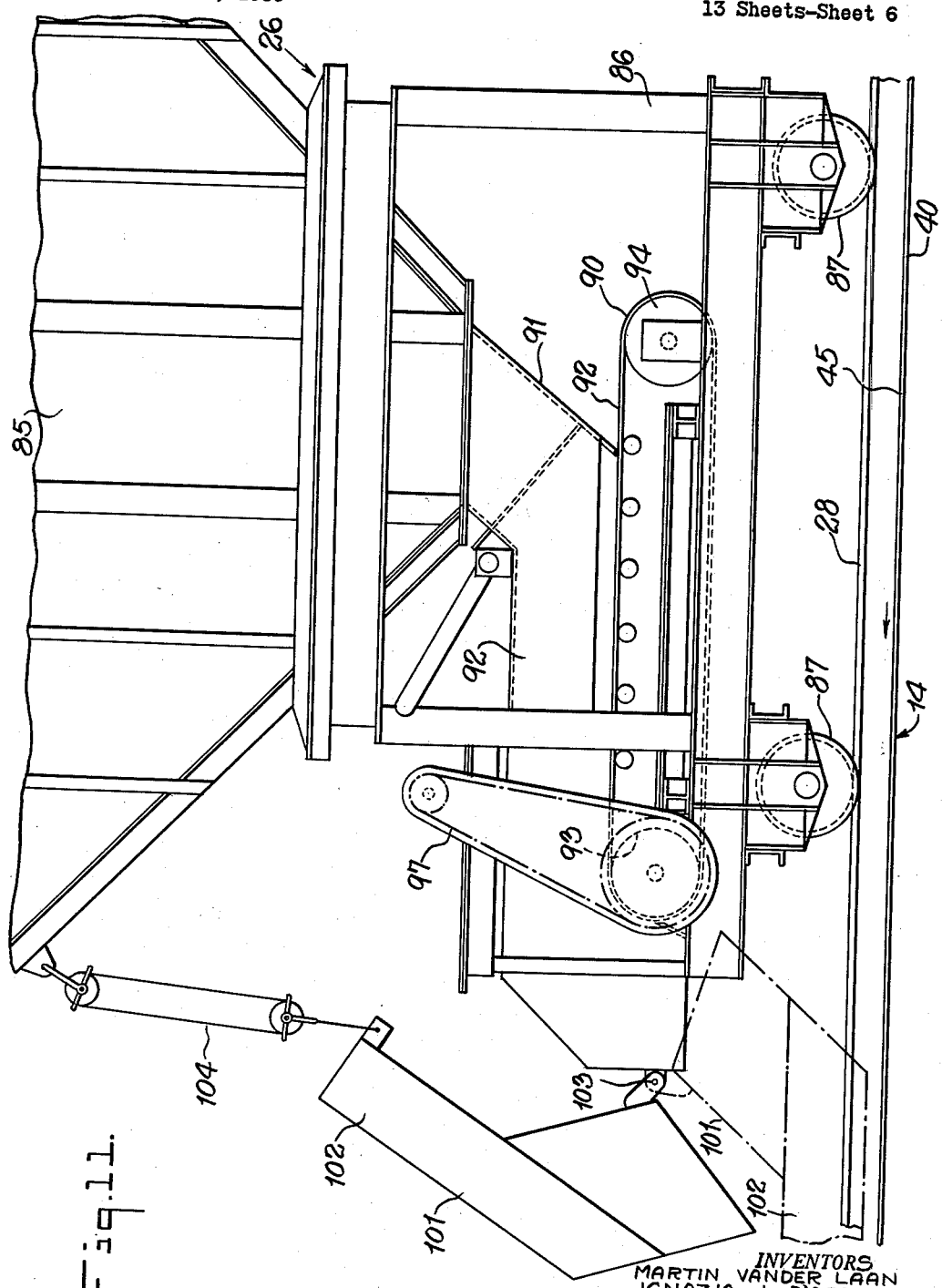

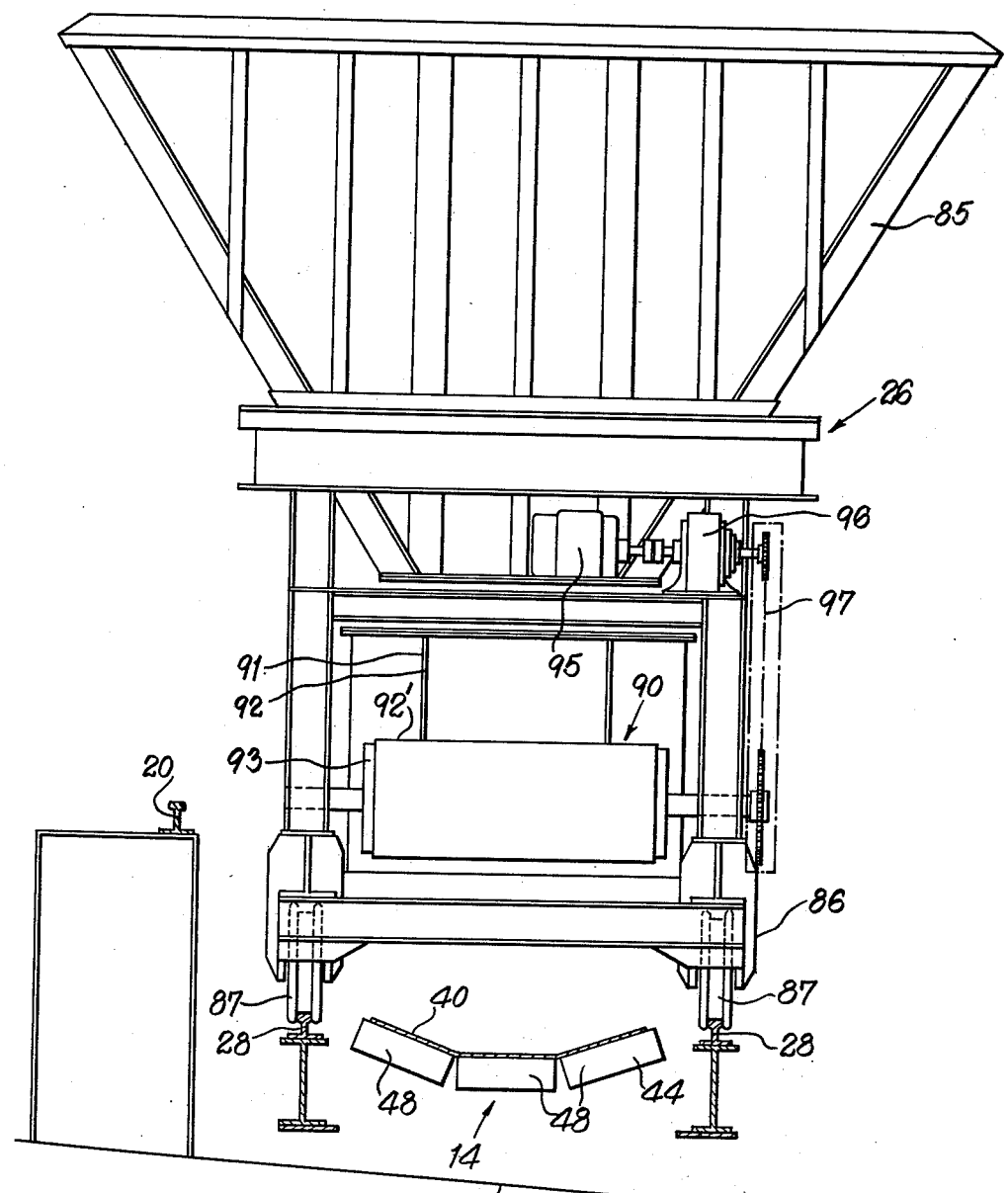

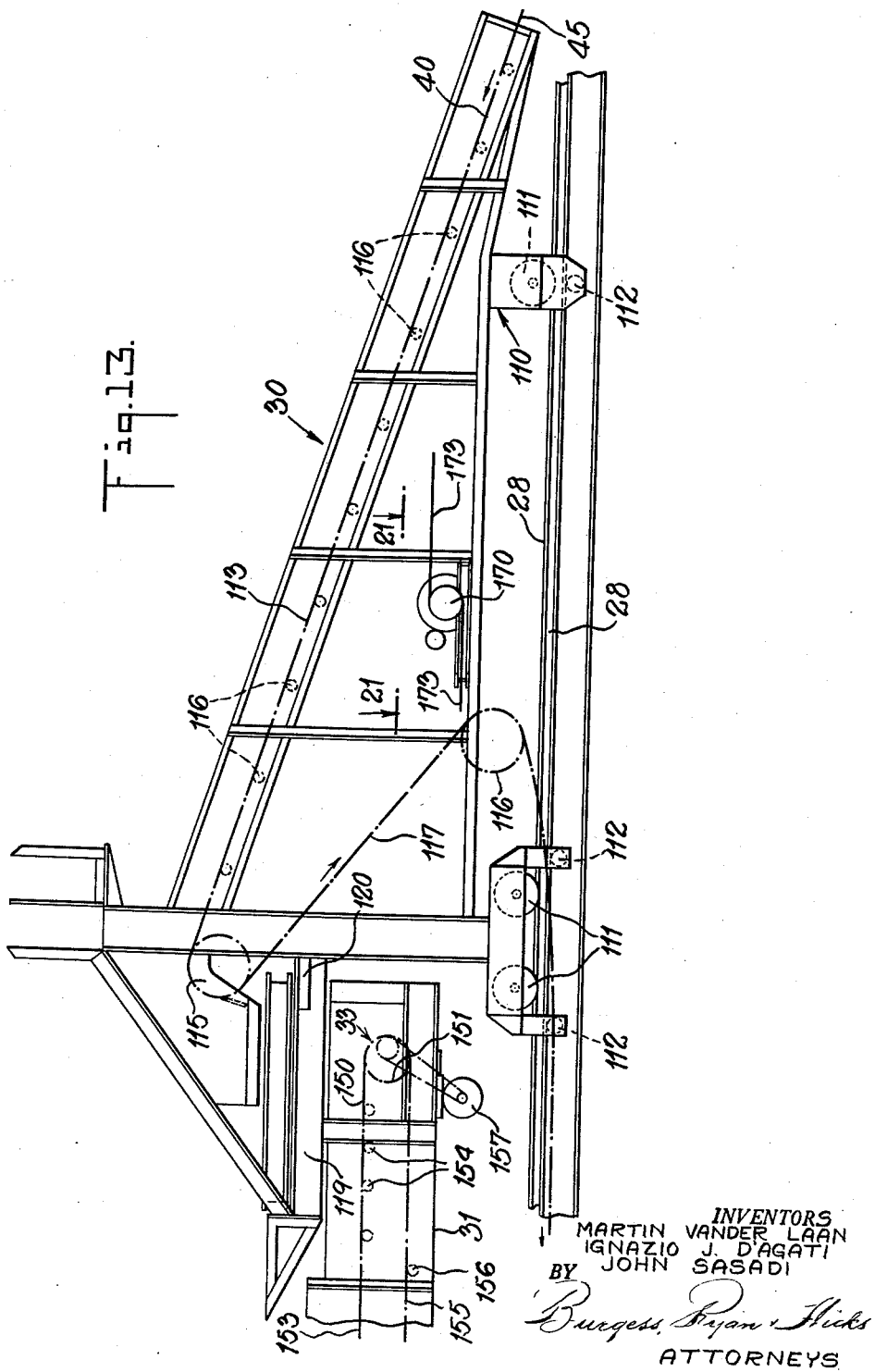

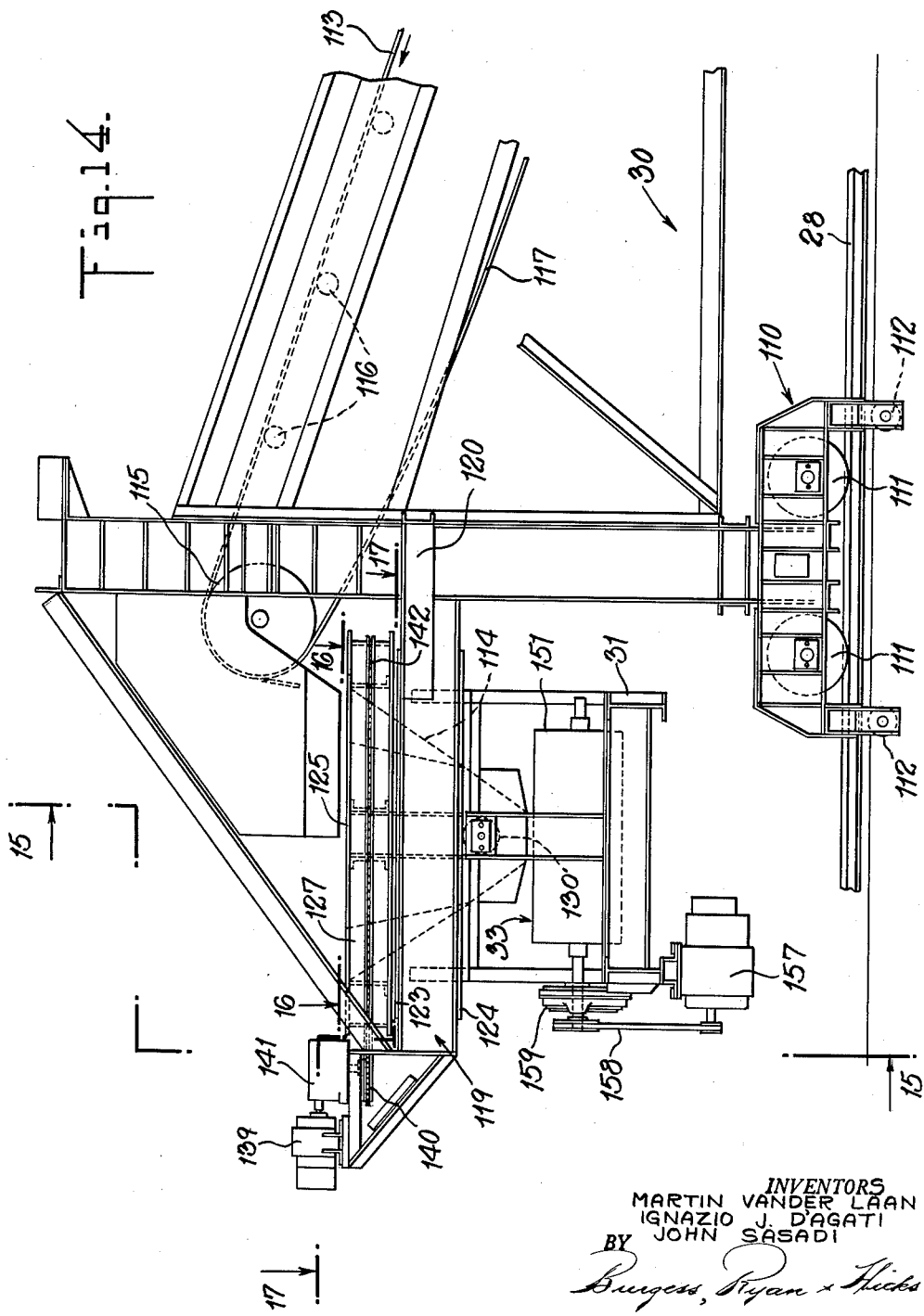

INVENTORS
MARTIN VANDER LAAN
IGNAZIO J. D'AGATI
JOHN SASADI
BY
Burgess, Ryan, & Hicks
ATTORNEYS

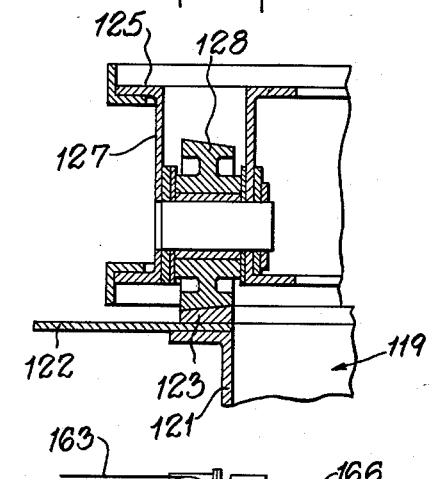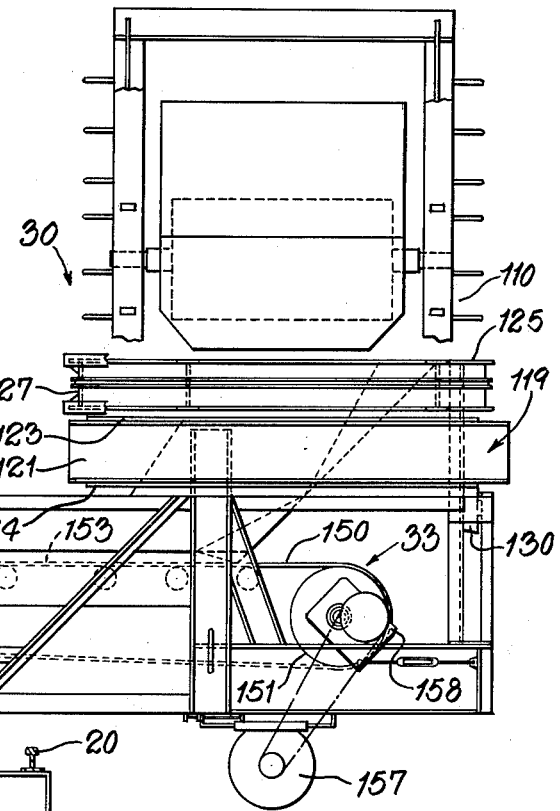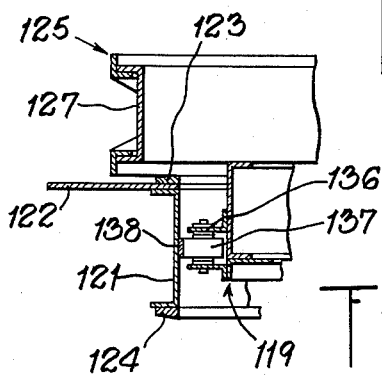

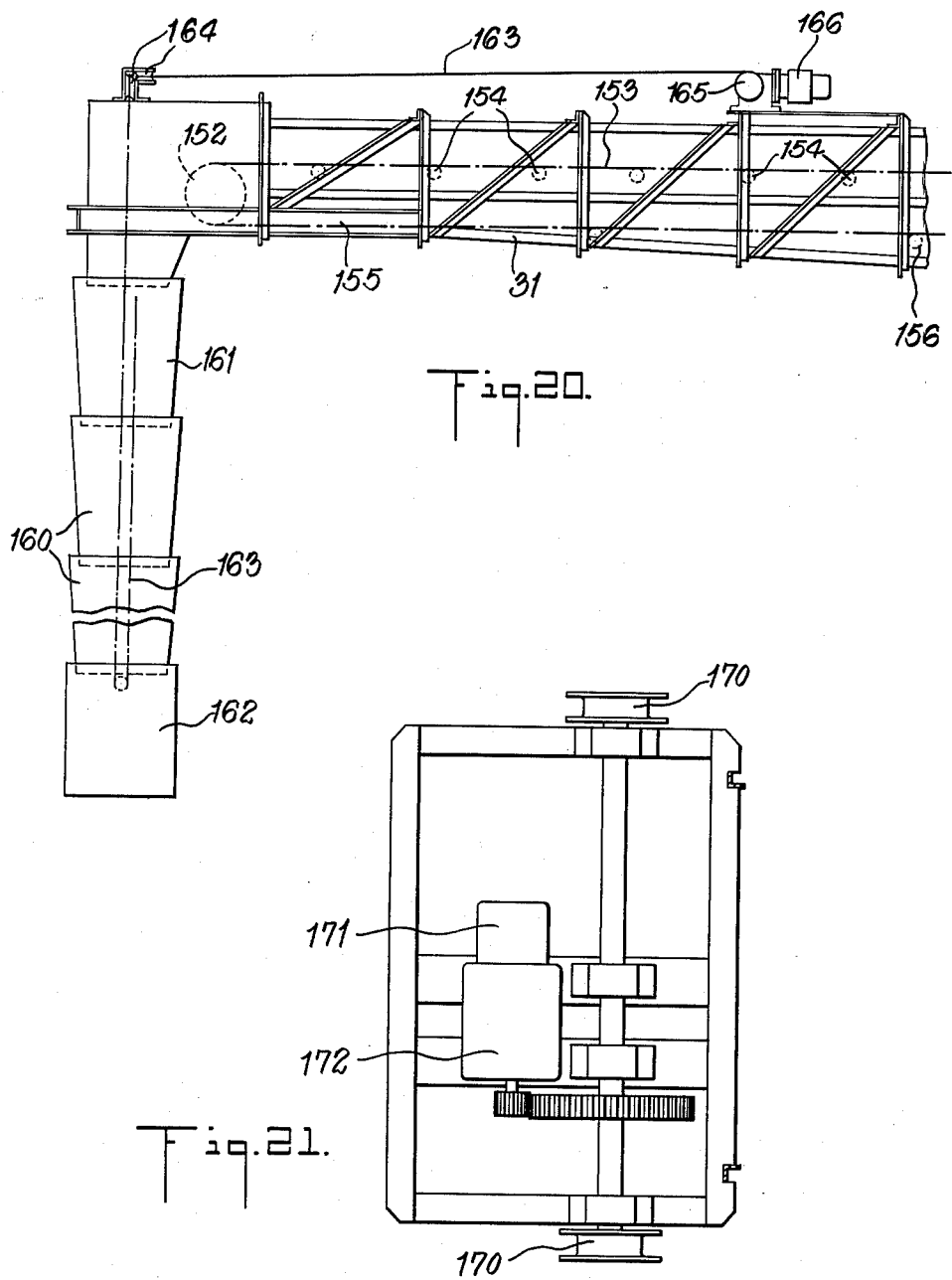

United States Patent Office 3,077,270
Patented Feb. 12, 1963

3,077,270
CONVEYOR SYSTEM FOR CARGO VESSEL
Martin Vander Laan, Packanack Lake, N.J., Ignazio J. D'Agati, Syosset, N.Y., and John Sasadi, Newark, N.J., assignors to Hewitt-Robins Incorporated, New York, N.Y., a corporation of New York
Filed Oct. 28, 1959, Ser. No. 849,314
16 Claims. (Cl. 214—15)

The present invention relates to a conveyor system employed in connection with a self-loading and self-unloading marine vessel.

One object of the present invention is to provide a new and improved deck conveyor system, which can be employed in conjunction with a self-loading and self-unloading marine vessel for bulk or loose material and which is flexible enough to permit selectively any number of different types of cargo transfer operations to be caried out to or from the vessel and to and from a loading or unloading point or station alongside of the vessel.

In accordance with certain features of the present invention, there is provided a closed circuit deck conveyor system for a self-loading and self-unloading vessel, operable in a continuous direction around the hold of the vessel and comprising longitudinal side conveyors along the starboard and port sides respectively of the vessel joined by end cross-conveyors therebetween near the forward and aft ends of the vessel. The vessel utilizes traveling cranes for transferring the bulk material from its hold to a freight boat, such as a barge, or to a freight carrier on a fixed shore installation or utilizes the cranes for loading the material into the vessel's hold from a freight boat or from a freight carrier on a short installation. Also in conjunction with the conveyor system, there are provided traveling hoppers on the side conveyors respectively normally attached to the cranes respectively for travel therewith along the conveyors, and a pair of swinging boom trippers adjustable along the side conveyors respectively and each with its own boom conveyor.

With the system described, either tripper boom conveyor can discharge into its preceding end cross-conveyor, thereby permitting loading or unloading with a capacity equal to that afforded by two cranes. The swinging boom of each tripper can be turned in an outboard direction to discharge at a fixed point or trim the load of the vessel to barges alongside of the vessel, or can be turned in an inboard direction for trimming the vessel's hold or holds. Hopper cars normally attached to the respective cranes are removable from their respective side conveyors, so that both of said cars can be located on either selected side of the vessel, if the cranes are to operate on said selected side only.

With the system described, the following combinations of loading or unloading operations can, for example, be carried out. For loading the vessel, (1) the hold may be loaded from both sides simultaneously at 50% rated capacity for each side, each crane discharging its grab bucket into its respective hopper car attached thereto, and (2) the hold may be loaded from either side only at 100% capacity with both hopper cars located at said side. For unloading the vessel, (1) discharge into a freight carrier on a fixed shore installation can be carried out anywhere between the travel limits of the tripper from either side of the vessel, (2) discharge from both sides of the vessel simultaneously at 50% capacity for each side of the vessel can be brought about, and (3) the boom tripper can trim barges in a manner to reduce shuttling of the barges alongside of the vesel. Also, it is possible with the system of the present invention to load one part of the hold of the vessel while the other part is being unloaded.

In accordance with certain features of the present invention, the conveyor system need not go around all sides and ends of the hold of the vessel, but may comprise a pair of side conveyors extending along the starboard and port sides respectively of the vessel and flanking the sides of the hold of the vessel, and an end conveyor extending across one end of the hold in transfer communication with said side conveyors at said end, said conveyors being operable in continuous sequential direction along one of said side conveyors, along said end conveyor and then along the other side conveyor.

Various other objects, features and advantages of the invention are apparent from the following description and from the accompanying drawings, in which FIG. 1 is a top plan view of an ocean going cargo carrying vessel having a conveyor system embodying the present invention, and showing the booms of the two swinging boom trippers in full lines extending in an outboard direction for unloading the vessel from opposite sides simultaneously and in dotted lines extending in an inboard direction for loading the vessel from opposite sides simultaneously and showing in dotted lines the trippers in extreme forward and aft and storage positions;

FIG. 2 is a side elevation of the vessel of FIG. 1 but showing in dotted lines the tripper with its boom extended along its corresponding side conveyor to discharge onto the preceding aft cross-conveyor;

FIG. 3 is a section of the vessel taken on lines 3—3 of FIG. 1;

FIG. 4 is a section of the vessel taken on lines 4—4 of FIG. 1 but shown without the cranes or the swinging boom trippers;

Figure 16:
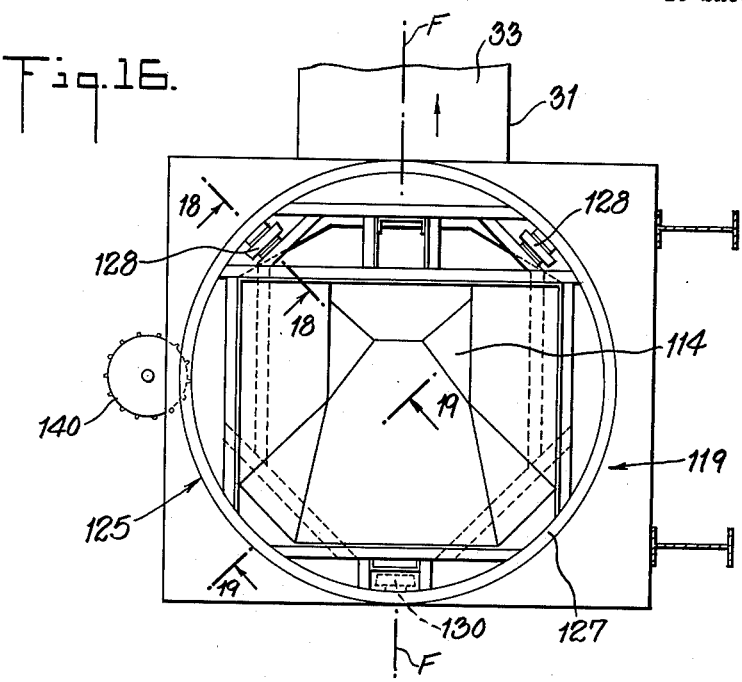
Figure 17:
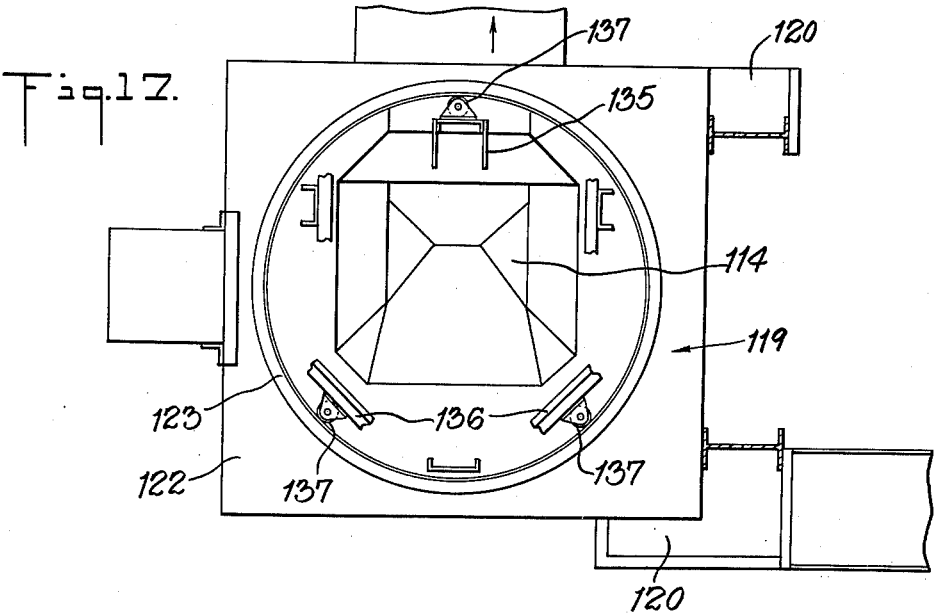

FIG. 5 is a diagrammatic side elevation of the forward part of the starboard side conveyor in conjunction with the associated swinging boom tripper as said conveyor appears by observation of FIG. 1 in the direction of the arrow $a$ on the starboard side and also represents the side elevation of the port side conveyor as it appears by observation of FIG. 1 in the direction of the arrow $a$ on the port side;

FIG. 6 is a diagrammatic side elevation of the part of the starboard side or port side conveyor located rearwardly of the part shown in FIG. 5 and matched thereto along the lines $c$—$c$;

FIG. 7 is a side elevation somewhat diagrammatic of the forward end section of the starboard side conveyor or of the port side conveyor taken by observation of FIG. 1 in the direction of the arrows $a$;

FIG. 8 is a side elevation somewhat diagrammatic of the rear end section of the starboard side conveyor or of the port side conveyor taken by observation of FIG. 1 in the direction of the arrows $a$;

FIG. 9 is a diagrammatic view partly in side elevation and partly in longitudinal section of the forward section of the forward end conveyor or of the aft end conveyor as viewed in the direction of the arrows $b$ in FIG. 1;

FIG. 10 is a diagrammatic view partly in side elevation and partly in longitudinal section of the rear section of the forward end conveyor or of aft end conveyor as viewed in the direction of the arrows $b$ in FIG. 1;

FIG. 11 is a side elevation somewhat diagrammatic of either hopper car;

FIG. 12 is an end elevation somewhat diagrammatic of the hopper car;

FIG. 13 is a side elevation somewhat diagrammatic of part of either swinging boom tripper and shows part of the boom extended along the corresponding side conveyor;

FIG. 14 is a side elevation somewhat diagrammatic of the other part of the swinging boom tripper but shows the boom turned into inboard direction;

FIGS. 15, 16 and 17 are sections of the swinging boom tripper taken on lines 15—15, 16—16 and 17—17 respectively of FIG. 14;

FIGS. 18 and 19 are detail sections taken on lines 18—18 and 19—19 of FIG. 16;

FIG. 20 is a side elevation of part of the tripper boom shown in connection with the telescopic chute;

FIG. 21 is a detail section of the haul drive for the swinging boom tripper taken on lines 21—21 of FIG. 13; and FIGS. 22, 23, 24, 25 and 26 show diagrammatically in top plan the conveyor system set-up for different operations respectively to illustrate the flexibility of the system.

*General Description of the Conveyor System*

Referring to FIGS. 1–4 of the drawings, there is shown a freight vessel or boat 10 of the ocean going type for carrying bulk, loose or agglomerate cargo material such as stone, coal, grain, sulphur, phosphate and the like which can be handled on a conveyor belt system. This vessel has an upper deck 11 and a hold 12 below the deck where the cargo is stowed. Supported on the deck 11 and extending around the hold 12 is a closed circuit belt conveyor system 13 operating in one continuous direction and comprising a longitudinal side conveyor 14 along the starboard side A of the vessel, a similar longitudinal side conveyor 15 along the port side B of the vessel, a cross conveyor 16 near the forward end C of the vessel and a cross conveyor 17 near the aft end D of the vessel. The end conveyors 16 and 17 extend between the ends of the side conveyors 14 and 15 and each serves to receive the bulk material from one end of one side conveyor and carry it across to the end of the other side conveyor. The conveyors 14, 15, 16 and 17 operate in the same circuitous sequential directions, as shown in FIG. 1.

Supported over the hold 12 on rails 20 extending on the deck 11 along the side of the hold are two travelling cranes 21 and 22 of the well-known revolving type movable along said rails and each comprising a jib 23 pivoted on a turntable 24 permitting said jib to swing selectively about a horizontal axis in and out and to turn about a vertical axis and carrying the usual grab bucket 25 for bulk cargo. Each of the cranes 21 and 22 can operate 360° within a wide range between the hold 12 of the boat and a hopper car 26 on the deck 11 normally attached to the corresponding crane or between an unloading station on the side of the vessel, such as a barge or a carrier on a short installation and the hopper car.

There are two hopper cars 26, one for each side of the vessel 10, each car being normally attached to the corresponding crane 21 or 22 and being supported on a pair of rails 28 extending on opposite sides of the corresponding side conveyor 14 or 15 for movement therealong with its corresponding crane. Each hopper car 26 is adapted to receive the loads from the grab bucket 25 of the corresponding crane 21 or 22 and to discharge them onto the corresponding side conveyor 14 or 15, in a manner to be described hereinafter. Each hopper car 26 can be detached from its corresponding crane 21 or 22 over one side conveyor 14 or 15 on one side of the vessel and transferred to the opposite side of the vessel over the other side conveyor to locate both hopper cars on the same side of the vessel and to permit both cranes to operate simultaneously on the same side of the vessel.

Also supported on the rails 28 on each side of the hold 12 is a swinging boom tripper 30, movable along said rails, and each comprising a substantially horizontal boom 31 swingable horizontally in an outboard direction by means of a turntable device to be described into position E for conveying the material from the corresponding side conveyor 14 or 15 to a point outside the vessel, as for example, to a barge or to a carrier on a dock or pier or other shore installation, or in an inboard direction into position F for conveying material from the corresponding side conveyor to the hold of the vessel. For that purpose, the boom 31 carries a boom conveyor 33 and a telescopic chute 34 depending from the outer end of the boom and into which the conveyor discharges. The construction of the swinging boom tripper 30 will be described with greater detail hereinafter.

The tripper boom 31 can also be swung horizontally into position G along the corresponding side conveyor 14 or 15, as shown in FIG. 2, to discharge, for example, on the preceding end conveyor 16 or 17, to carry the material from one side conveyor 14 or 15 to the other, and to permit thereby loading or unloading of the vessel with the capacity equal to two cranes 21 and 22.

Referring generally to the operation of the conveyor system described, each crane 21 or 22 can function to pick up cargo from the hold 12 and discharge it in the corresponding hopper car 26 or pick up the cargo from the outside of the vessel, as for example, from a barge or pier and discharge it into the hopper car. From the hopper car 26, the load is discharged onto the side conveyor 14 or 15 underneath the hopper car and carried therealong until it reaches the tripper 30 over said conveyor, where it is discharged onto the boom conveyor 33 and either into the hold 12, to a carrier on the side of the vessel or into the preceding end conveyor 16 or 17, according to the position of the tripper boom 31.

Some of the different modes of operation permitted by the conveyor system of the present invention will be more fully set forth after the individual components of the system have been described.

*Starboard and Port Side Conveyors*

Each of the longitudinal conveyors 14 and 15 comprises a conveyor belt 40 (FIGS. 5–8) of the usual flexible type extending along the side of the hold 12 and supported on the deck 11 of the boat. FIGS. 7 and 8 show in side elevation the opposite end sections respectively of the side conveyor 14 or 15, while FIGS. 5 and 6 conjointly show diagrammatically in side elevation the two successive sections respectively of the whole conveyor 14 or 15 joined together along the match lines c—c in FIGS. 5 and 6.

The conveyor belt 40 is trained at its forward end around a drive pulley 41 and at the other rear end about a tail pulley 42. The conveyor belt 40 shown in FIGS. 5–8 is that of the starboard side conveyor 14, as viewed in the direction of the arrow a on the starboard side of FIG. 1, but FIGS. 5–8 also represent the belt of the port side conveyor 15 as seen by observation of FIG. 1 in the direction of the arrow a on the port side of FIG. 1. In other words, the two side conveyors 14 and 15 are exactly the same but are arranged in reverse direction, so that the forward drive end of the starboard side conveyor 14 is near the aft end of the vessel 10 while the drive end of the port side conveyor 15 is near the forward end of the vessel. For that reason, only the starboard side conveyor 14 is described with the understanding that the port side conveyor 15 is similarly constructed but is arranged in reverse relationship.

Between the two conveyor pulleys 41 and 42, there is a series of idlers 44 for supporting the upper run 45 of the conveyor belt 40 substantially horizontally for its major length and a series of idlers 46 for supporting the lower run 47 of the belt. The upper series of idlers 44 are of the type to trough the upper belt run 45 and for that purpose, each comprises three idlers 48 (FIG. 9) connected by chain links or other flexible connections end to end in axially angular relationship to define a belt troughing support, the outer ends of the outside idler pulleys being connected by chain links or the like to a conveyor frame, as in the manner of the usual troughing idler pulleys.

The lower idlers 46 are straight across the full width of the conveyor belt 40.

The forward drive end of the conveyor 40 located near the aft cross conveyor and shown in FIGS. 5 and 7, comprises a motor (not shown) driving the drive pulley 41 through a speed reduction unit 49 and a chain drive 50 from said unit to said pulley. The belt 40 at its drive end is trained around a series of pulleys to slant the upper run 45 of said belt near said end upwardly in its direction of movement and to elevate thereby the discharge end of said belt above the inlet end of the aft cross conveyor 17, so that material discharged from the conveyor 40 drops by gravity through a chute 51 onto the cross conveyor 17. To that end, the idlers 44 are arranged at progressively increasing height as they approach the drive end of the belt 40 to slant the upper run of said belt near said end upwardly in its direction of movement, and the return run of the belt at the drive end is serpentined around idlers 52, 53, 54 and 55. The idler 54 is adjustable along a frame support 56 to serve as a take-up roller.

At the intake rear end of the conveyor 14 shown in FIGS. 6 and 8, the upper belt run 45 after passing around the tail pulley 42 passes underneath a take-up idler 56 to depress slantingly this upper run a substantial distance below the discharge end of the forward cross conveyor 16, so that gravity discharge of the material in an orderly manner from said conveyor 16 onto the belt 40 of the conveyor 14 through a chute 57 (FIGS. 8 and 9) is effected. Idlers 60 supporting the part of the upper belt run 45 near the tail pulley 42 underneath the chute 57 need not be of the belt troughing type but may be straight across to support the belt transversely straight.

*Forward and Aft Cross Conveyors*

Each of the cross end conveyors 16 and 17 comprises a conveyor belt 65 (FIGS. 9 and 10) of the usual flexible type extending across the ends of the hold 12 and supported on the deck 11 of the vessel 10. FIGS. 9 and 10 show in side elevation the opposite end sections respectively of the cross conveyors 16 and 17. The conveyor belt 65 shown in FIGS. 9 and 10 is that of the forward cross conveyor 16 as viewed in the direction of the arrow *b* of FIG. 1 at the forward end but FIGS. 9 and 10 also represent the belt of the aft cross conveyor 17 when observed in FIG. 1 in the direction of the arrow *b* at the aft end of the vsesel. In other words, the two cross conveyors 16 and 17 are exactly the same but are arranged in reverse direction, so that the drive end of the forward cross conveyor 16 is near the intake end of the starboard side conveyor 14, while the drive end of the aft cross conveyor 17 is near the intake end of the port side conveyor 15. For that reason, only the forward cross conveyor 16 is described with the understanding that the aft cross conveyor 17 is similarly constructed but is arranged in reverse direction.

The drive end of the forward cross conveyor 16 comprises a drive pulley 66 (FIGS. 8 and 9) at the discharge of the conveyor driven from a motor 67 through a speed reduction unit 68. The conveyor belt 65 is trained around this drive pulley 66 at one end of the end conveyor 16 and around a tail pulley 71 at the other end of the conveyor and has its upper run 72 supported by idlers 73, which may be of the belt troughing type and its lower run 74 supported on straight horizontal idlers 75. The upper run 72 of the conveyor belt 65 throughout its length slants upwardly in its direction of movement to elevate the discharge end of this run above the starboard side conveyor 14, as shown in FIG. 9, so that the material from said conveyor belt drops at this discharge end through the chute 57 (FIGS. 8 and 9) by gravity onto the latter conveyor.

Under the chute 51, idlers 78 supporting the upper run 72 of the conveyor belt 70 may be horizontally straight across to support the belt transversely.

*Hopper Cars*

As already described, two hopper cars 26, one for each side of the vessel are provided. These hopper cars 26 are normally attached to the cranes 21 and 22 respectively but may be detached from a crane over one conveyor 14 or 15 on one side of the vessel and transferred to the opposite side of the vessel over the other conveyor to locate both cranes on the same side of the vessel and permit both cranes to operate simultaneously on the same side of the vessel.

The hopper car 26 over the starboard side conveyor 14 is shown in FIGS. 11 and 12, but it must be understood that the hopper car 26 over the port side conveyor 14 is of similar construction. This hopper car 26 has a chute 85 supported on a carriage 86 with wheels 87 riding on the rails 28. The carriage 86 supports a conveyor 90 which is located directly underneath the chute 85 and directly over the starboard side conveyor 14 and which extends along the latter conveyor. A conduit 91 having a section 92 in the form of an inverted trough extends between the discharge end of the chute 85 and the conveyor 90 to confine the material as it is dropped onto said conveyor.

The hopper car conveyor 90 comprises a conveyor belt 92' trained over a drive pulley 93 and a tail pulley 94. The drive pulley 93 is driven from a motor 95 through a speed reduction unit 96 and a chain drive 97.

The forward end of the hopper car conveyor 90 discharges the material onto the starboard side conveyor 14 through a guide conduit 101 having a section 102 in the form of an inverted trough directly over the top run 45 of the conveyor 14. Since the hopper car 26 is moved along the rails 28, the conduit 101 riding so close to the top run 45 of the conveyor 14 may interfere with said movement. For that reason, the conduit 101 is hinged at 103 to the frame structure of the hopper car 26 and can be raised into the inoperative position shown in full lines or into operative position shown in dot and dash lines by a block and tackle 104.

*Swinging Boom Tripper*

The swinging boom tripper 30 shown in FIGS. 5, 13 to 21 serves as a device by which the material from the starboard and port side conveyors 14 and 15 is carried either to an unloading station outside the vessel 10 to unload the vessel or to the hold 12 of the vessel to load the vessel. Two of these trippers 30 are provided along the conveyors 14 and 15 respectively, and these are movable along their respective conveyors by means to be described. Since these trippers 30 are of similar construction, only the one associated with the starboard side conveyor 14 is described.

The tripper 30 comprises a carriage or truck 110 (FIGS. 13, 14 and 15) having wheels 111 riding on the rails 28 and since the tripper carries a boom 31 with associated devices tending to tilt the tripper, the carriage also has rollers 112 engaging the underside of the top flanges of the rails to prevent uplift of said carriage.

The upper run 45 of the conveyor belt 40 is looped around a pulley system carried by the tripper carriage 110 to slant the section 113 (FIGS. 5, 13 and 14) of said belt run along said carriage upwardly in the direction of movement of the belt run, so that the material on said belt run is permitted to be gravitionally discharged onto a hopper 114 (FIGS. 13–17) directly over the boom conveyor 33. For that purpose, the section 113 (FIGS. 5, 13 and 14) of the upper belt run 45 along the tripper carriage 110 is supported on belt troughing idlers 116 which are similar to the idlers 44 for supporting the horizontal stretch of said belt run, but which are arranged at progressively increasing elevations, to slant the belt section upwardly in the direction of belt movement, as shown in FIGS. 13 and 14. The angle of slant of this forwardly inclined belt section 113 with respect to the horizontal is small enough to retain the material in said belt section against rollback or slideback.

The upper belt run 45 on the tripper carriage 110 passes over an idler pulley 115 (FIGS. 5, 13 and 14) on said carriage, is drawn back over an idler pulley 116 also on said carriage to define a rearwardly inclined belt section 117 and is trained forwardly from the latter pulley to continue the horizontal course of the belt run. The tripper, thereby produces a loop 113, 117 which is progressively formed along the length of the conveyor belt 40 as the tripper 30 is moved along its rails 28.

The forward end of the tripper carriage 110 carries the boom 31 rotatably supported by means of a turntable device shown in FIGS. 13 to 19. This device comprises a turntable support 119 rigidly affixed to the forward end of the frame structure of the tripper carriage 110 by means of brackets 120 and comprising a channel ring 121 (FIG. 19), and a fixed annular rail 123 secured to the top of a frame plate 122 (FIGS. 17 and 19), and a fixed annular rail 123 secured to the top of a frame plate 122 (FIGS. 17 and 19), which in turn is secured to the upper end of said ring. A fixed annular rail 124 is secured to the lower end of the channel ring 121.

Rotatably supported on the fixed support 119 is a turntable 125 (FIGS. 14, 15, 16, 18 and 19) carrying the chute 114 at and below the discharge end of the inclined section 113 of the upper run of the conveyor belt 45 and consisting essentially of a channel ring 127 carrying the upper supporting structure for the chute 114 and carrying in conjunction with said frame structure two support wheels 128, which are spaced at an angle of about 43° from opposite sides of the vertical plane F passing through the longitudinal center of the boom 31 (86° total between their radii) and which are located on the side of the center of the turntable ring 127 nearest said boom. The support wheels 128 ride on the upper rail 123 secured to the fixed turntable support 119. The boom 31 below the turntable ring 127 and secured to said ring for rotation therewith rotatably carries an uplift wheel 130 on a radial axis, which is centered with respect to the two support wheels 128, so that said axis is in the vertical plane F passing through the longitudinal center of the boom and which is located on the side of the center of the turntable ring 127 farthest from the boom 31. This uplift wheel 130 rides along and bears upwardly against the lower rail 124 secured to the fixed turntable support 119. With the arrangement shown, the boom 31 is supported against downward tilting movement.

The boom 31 is not only supported against downward and tilting movement by the fixed turntable support 119, but is also guided by said support against horizontal movement while retained on a rotative axis. To that end, the turntable ring 127 has rigidly secured thereto brackets 135 and 136 (FIGS. 17 and 19) rotatably carrying on respective vertical axes three guide rollers 137 inside the fixed channel ring 121 riding along an annular rail 138 located on the inner periphery of the channel ring and affixed thereto.

For driving the turntable 125 through an angle of 180° to move the boom 31 from inboard position to a position along the starboard side conveyor 14, and to an outboard position and vice versa, there is provided a reversible motor 139 (FIG. 14) driving a sprocket wheel 140 through a speed reduction unit 141. This sprocket wheel 140 meshes with a sprocket chain 142 embracing and affixed to the turntable ring 127, as for example, by welding.

The boom 31 carries the conveyor 33 (FIGS. 13, 14, 15 and 20) extending along the boom for discharge into the telescopic chute 34 at the outer end of the boom, as previously described. This conveyor 33 comprises a conveyor belt 150 passing over a drive pulley 151 and a tail pulley 152 and having its upper horizontal run 153 supported on idlers 154 desirably of the belt troughing type, and its lower run 155 supported on idlers 156 of the type to support said lower belt run transversely straight. The pulley 151 is driven from a motor 157 (FIGS. 14 and 15) on the boom 31 through a belt and sheave groove pulley drive 158 and then through a speed reduction unit 159 to the shaft of said pulley 151.

With the construction described, as the material drops through the chute 114 from the inclined section 113 of the upper run of the conveyor belt 45 on the tripper 30, it is discharged onto the boom conveyor 33 and carried thereby along the boom 31 from its inner end to its outer end where it is discharged into the telescopic chute 34. The telescopic chute 34 comprises a series of conical tubular sections 160 (FIG. 20) extending one inside the other and hanging down from a top tubular section 161 affixed to the boom 31 and terminates at its lower end in a cylindrical tube section 162 by which the chute may be telescopically collapsed or extended. For telescopically collapsing or extending the chute 34, the lower tube section 162 has secured to the opposite sides thereof a pair of cables 163 passing upwardly on opposite sides of the chute, then over idlers 164 and horizontally over and along the boom 31 to two drums 165 on said boom on opposite sides of a drive motor 166 by which the cables may be wound or unwound.

The operation of the motor 165 is automatically controlled by a level indicator (not shown) at the lower end of the chute 34, sensing the level of material deposited by the chute and operating the motor to collapse the chute progressively as this level rises. This level indicator may be of the type disclosed in the U.S. Patent 2,774,959.

As far as certain aspects of the invention are concerned, the tripper 30 may be moved along the rails 28 by any suitable means but is desirably moved by rope haul means comprising a pair of rope drums 170 (FIGS. 13 and 21) mounted on the tripper on opposite sides thereof and driven from a reversible motor 171 through a speed reduction unit 172. Two ropes 173 extending along the rails 28 on opposite sides of the tripper 30 respectively have their ends anchored at fixed stations near the ends of the conveyor system 14 or 15 and have their intermediate sections wound for a number of turns about the rope drums 170 respectively. The ropes 173 are spring-tensioned near their opposite ends where they are anchored, and as the motor 171 rotates in either direction, the rope drums 170 turn in the corresponding direction, causing said drums to wind the rope sections on one side of the drums, while unwinding the rope sections on the opposite side of the drums. This operation hauls the tripper 30 along the rails 28, until the tripper reaches the desired position, whereupon the motor 171 is shut off.

It is important that near the input end of the conveyor belt 40 of the starboard side conveyor 14 close to the forward end of the vessel 10, the tripper 30 be limited in a position which will assure that the inclined upper belt run section 113 on the tripper will have a slope no greater than that necessary to assure against rollback or slideback of the material carried by said belt run section. For that purpose, a bumper 175 (FIG. 8) is provided near the input end of the starboard side conveyor belt 40 serving as a stop for the tripper 30. A similar bumper is provided near the inlet end of the conveyor belt of the port side conveyor 15 near the aft end of the vessel for the tripper 30 associated with said conveyor belt.

*Operation of the Conveyor System*

Although the operation of the conveyor system is obvious from the foregoing description, it is summarized herein, as follows:

The cranes 21 and 22 may be moved over the hold 12 along the rails 20 and each has a range of operation, (1) permitting the material in the hold to be picked up by its grab bucket 25 for ship unloading operations and to be deposited into the hopper car 26 on either side of the vessel attached to the crane, or (2) permitting the material to be picked up by the grab bucket from a carrier on the side of the vessel, such a barge or a freight car on a dock or pier for boat loading operation and to be deposited into the hopper car 26 on the side of the vessel nearest said carrier and attached to the crane. The material dropped into the hopper car 26 is discharged through its chute 85 and onto the conveyor 90, which in turn discharges it onto the upper run 45 of the conveyor belt 40 of the side conveyors 14 or 15. The material is carried by the side conveyor 14 or 15 to the tripper 30. The tripper 30 will have its boom 31 set in either one of three positions, namely in an outboard position for loading into a carrier outside the vessel or along the associated side conveyor 14 or 15 for redirecting the material on an advanced section of the conveyor or on the preceding cross conveyor 16 or 17 for transfer to the other side conveyor 14 or 15 for handling by the other tripper 30 associated with the latter conveyor.

The flexibility of the conveyor system is made apparent by different set-ups shown in FIGS. 22–26, but it must be understood that other useful set-ups are possible with this system.

Figure 22:
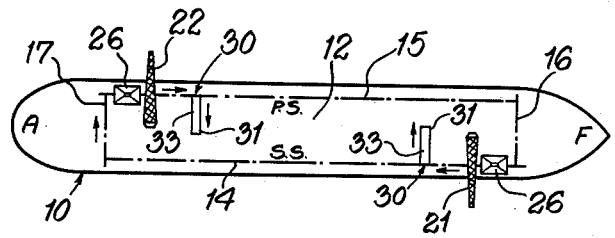

Referring to FIG. 22, there is shown the vessel 10 being loaded from both sides simultaneously from a barge and/or from a carrier on a pier or deck with 50% rated capacity on each side. For that purpose, the boom 31 of both trippers on opposite side conveyors 14 and 15 are shown turned in an inboard direction to load the hold 12 of the vessel. Each crane 21 or 22 discharges its grab bucket 25 into its respective hopper car 26. From the chute 85 of the hopper car 26, the material is discharged onto the conveyor 90 and then from said conveyor to the corresponding side conveyor 14 and 15 which carries the material to the corresponding tripper 30. The tripper 30 discharges onto the tripper boom conveyor 33 and through the telescopic chute 34 into the hold 12 of the vessel. It should be noted that the crane 21 or 22 and the boom tripper 30 or each side of the vessel is effective for operation along substantially the full length of the hold 12.

Figure 23:
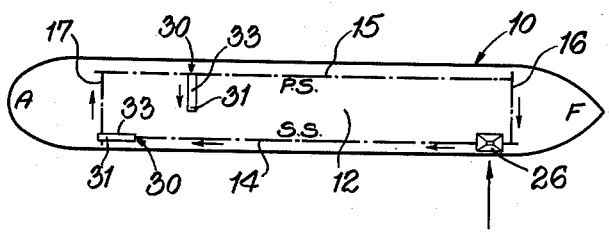

FIG. 23 shows an arrangement in which the vessel 10 is loaded from one side at a 100% capacity and the material is all discharged into the vessel's hold 12 from the opposite side. In the specific set-up shown, the boom 31 of the tripper 30 on the starboard side is shown extended along the starboard side conveyor 14 for discharge onto the aft cross conveyor 17 and the boom 31 of the tripper 30 on the port side is in an inboard position for loading the hold 12. The material is discharged into the hopper car 26 on the starboard side conveyor 14 near its forward end from the crane 21 or 22 on the vessel or from a crane outside the vessel. As shown, the vessel 10 can be fixed, for example, with respect to a shore landing from which the boat is loaded and the full length of the hold loaded and trimmed by a single tripper boom 31, without shifting the vessel with respect to said shore landing.

Figure 24:
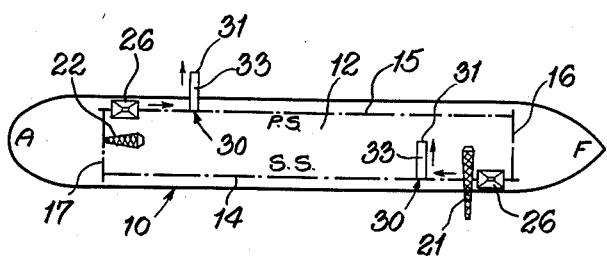

FIG. 24 shows an arrangement in which the vessel may be unloaded at 50% capacity from one side and simultaneously loaded at 50% from the other side. In the specific arrangement shown, the boom 31 of the tripper 30 on the starboard side conveyor 14 is shown turned in an inboard direction for loading the hold 12 of the vessel, while the boom 31 of the tripper 30 on the port side conveyor 15 is shown turned in an outboard direction to discharge onto a carrier on the side of the vessel, as for example, a barge or a freight car on a shore landing. The crane 21 unloads a carrier on the starboard side of the vessel and discharges onto the corresponding hopper car 26 which in turn discharges onto the starboard side conveyor 14 for conveyance to the tripper boom 31 on said conveyor and in turn to one part of the hold 12 of the vessel. At the same time, the crane 22 is unloading from another part of the hold 12 onto the corresponding hopper car 26 for discharge onto the port side conveyor 15, which in turn carries the material to the boom 31 of the tripper 30 over said conveyor for discharge to a carrier, such as a barge or a freight car on a shore landing on the port side of the vessel.

Figure 25:
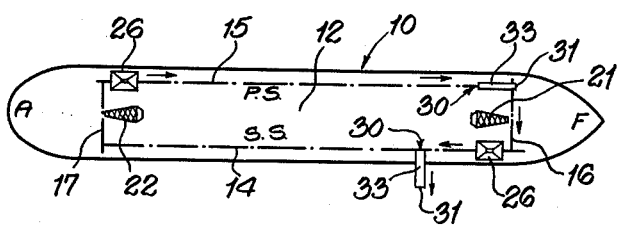

FIG. 25 shows an arrangement which permits unloading from either side of the vessel at 100% capacity with both cranes 21 and 22 operating and with the unloading station fixed anywhere between the travel limits of the unloading tripper 30. In the specific arrangement shown, the boom 31 of the tripper 30 on the starboard side conveyor 14 is directed into outboard direction for unloading at a station on the starboard side of the boat, and the boom 31 of the tripper 30 on the port side conveyor 15 is directed along the latter conveyor for discharge directly onto the preceding forward cross conveyor 16. The material is unloaded from one part of the hold 12 of the vessel by means of the crane 21, discharged into the hopper car 26 over the starboard side conveyor 14 and carried by said conveyor to the boom 31 of the tripper 30 and over the boom conveyor 33 for discharge to the unloading station on the starboard side of the vessel. At the same time, the crane 22 is unloading the material from another part of the hold 12 of the vessel and discharging it into the hopper car 26 over the port side conveyor 15 for discharge onto said conveyor. The material is carried by the port side conveyor 15 to the boom 31 of the tripper 30 on said conveyor and is discharged from said boom onto the forward cross conveyor 16 and carried by the latter conveyor to the starboard side conveyor 14 for discharge by the boom 31 of the tripper on the latter conveyor for unloading onto the station on the starboard side of the vessel.

Figure 26:
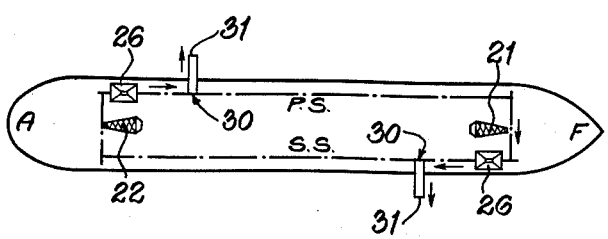

FIG. 26 shows an arrangement in which the vessel is unloaded simultaneously from both sides at 50% capacity at each side. In the specific arrangement shown, the booms 31 of both trippers 30 on opposite sides of the vessel are directed into outboard positions for discharge into carriers on opposite sides of the vessel and the two cranes 21 and 22 unload different parts of the hold 12 of the vessel and discharge onto the corresponding hopper cars 26 for discharge onto the respective starboard side and port side conveyors 14 and 15. From the latter conveyors 14 and 15, the material is picked up by the trippers 30 on said conveyors respectively and carried by the boom conveyors 33 to the carriers on opposite sides respectively of the vessel.

It must be noted that in both loading or unloading operations, the tripper 30 can be moved along its respective side conveyor 14 or 15, so that shuttling of barges alongside of the vessel or shifting of the vessel in relation to the loading or unloading station outside the vessel is eliminated or materially reduced.

While the invention has been described with particular reference to a specific embodiment, it is to be understood that it is not to be limited thereto but is to be construed broadly and restricted solely by the scope of the appended claims.

What is claimed is:

1. In combination with a cargo vessel having a hold, a closed circuit conveyor system for the cargo vessel comprising a pair of side belt conveyors extending along the starboard and port sides respectively of the vessel and flanking the sides of the hold of the vessel, and a pair of end belt conveyors extending across the ends respectively of the hold in transfer communication with the ends of said side conveyors, said conveyors being operable in continuous sequential directions around the hold, and means for transferring bulk material from each side conveyor laterally thereof selectively in inboard or outboard directions for substantial distances from the latter conveyor, said transferring means being movable along the corresponding side conveyor.

2. The combination as described in claim 1, wherein each of said transferring means comprises a swinging boom tripper on the corresponding side conveyor having a boom, a belt conveyor along said boom, means for transferring the bulk material from the corresponding side conveyor to said boom conveyor, and means for swinging said boom between inboard and outboard positions in relation to said side conveyor.

3. The combination as described in claim 1, comprising a crane over said vessel hold for transferring material from said hold to one of said conveyors.

4. The combination as described in claim 1, comprising a hopper car movable along one of said conveyors, and a crane over said vessel hold for transferring material from said hold to said hopper car.

5. In combination, a bulk cargo vessel having a hold, a closed circuit conveyor system for said vessel comprising a pair of side belt conveyors extending along the starboard and port sides respectively of the vessel and flanking the sides of the hold of the vessel, and a pair of end belt conveyors extending across the ends respectively of the hold in transfer communication with the ends of said side conveyors, said conveyors being operable in continuous sequential directions around the hold, a pair of cranes over said hold for transferring bulk material selectively from said hold or from a point outside of said vessel to either of said side conveyors and adapted to travel along said hold, and means for transferring the bulk material from each side conveyor laterally thereof, said transferring means being movable along the corresponding side conveyor.

6. The combination as described in claim 5, wherein each of said transferring means comprises a swinging boom tripper forming a discharge loop in the belt of the corresponding side conveyor, said tripper having a boom, a belt conveyor along said boom under said belt discharge loop to receive bulk material gravitationally from said discharge loop, and means for swinging said boom substantially horizontally selectively into inboard or outboard positions in relation to said side conveyor.

7. The combination as described in claim 5, wherein a hopper car is provided over each side conveyor adjacent to the corresponding crane for receiving the load from the corresponding crane and discharging it onto the corresponding side conveyor.

8. The combination as described in claim 5, wherein a hopper car is provided over each side conveyor adjacent to the corresponding crane for receiving the load from the corresponding crane and discharging it onto the corresponding side conveyor, said hopper car being normally attached to the corresponding crane for travel therewith along the hold and being detachable therefrom and transportable from one side conveyor to the other.

9. In combination, a bulk cargo vessel having a hold, a closed circuit conveyor system for said vessel comprising a pair of side belt conveyors extending along the starboard and port sides respectively of the vessel and flanking the sides of the hold of the vessel, and a pair of end belt conveyors extending across the ends respectively of the hold in transfer communication with the ends of said side conveyors, said conveyors being operable in continuous sequential directions around the hold, a pair of cranes over said hold for transferring bulk material selectively from said hold or from a point outside of said vessel to either of said side conveyors and adapted to travel along said hold, a swinging boom tripper on each of said side conveyors movable along the corresponding side conveyor and having a boom supported for swinging movement substantially horizontally either in an inboard direction or outboard direction, or in a direction along the corresponding side conveyor, and a belt conveyor on and along said boom in position to receive material from the corresponding side conveyor and carry it to the outer end of the boom.

10. The combination as described in claim 9, comprising a collapsible chute at the outer end of each boom in position to receive the material from the conveyor on the latter boom.

11. In combination with a cargo vessel having a hold, a closed circuit conveyor system for the cargo vessel comprising a pair of side belt conveyors extending along the starboard and port sides respectively of the vessel and flanking the sides of the hold of the vessel, and a pair of end belt conveyors extending across the ends respectively of the hold and arranged in transfer communication with the ends of said side conveyors, said conveyors being operable in continuous sequential directions around the hold, means for transferring the bulk material from each side conveyor laterally thereof selectively in inboard or outboard direction for substantial distances from the latter conveyor, each of said transferring means being movable along the corresponding side conveyor, and comprising a swinging boom tripper on the corresponding side conveyor having a boom, a belt conveyor along said boom, means for transferring the bulk material from the corresponding side conveyor to said boom conveyor, and means for swinging said boom between inboard and outboard positions in relation to the corresponding side conveyor, and a hopper car on each of said side conveyors movable along the latter conveyor.

12. In combination, a bulk cargo vessel having a hold, a closed circuit conveyor system for said vessel comprising a pair of side belt conveyors extending along the starboard and port sides respectively of the vessel and flanking the sides of the hold of the vessel, and a pair of end belt conveyors extending across the ends respectively of the hold in transfer communication with the ends of said side conveyors, said conveyors being operable in continuous sequential directions around the hold, a crane over said hold for transferring bulk material selectively from said hold or from a point outside of said vessel to either of said side conveyors and adapted to travel along said hold, and means for transferring the bulk material from each side conveyor laterally thereof, said transferring means being movable along the corresponding side conveyor.

13. In combination, a bulk cargo vessel having a hold, a closed circuit conveyor system for said vessel comprising a pair of side belt conveyors extending along the starboard and port sides respectively of the vessel and flanking the sides of the hold of the vessel, and a pair of end belt conveyors extending across the ends respectively of the hold in transfer communication with the ends of said conveyors, said conveyors being operable in continuous sequential directions around the hold, a crane over said hold for transferring bulk material selectively from said hold or from a point outside of said vessel to either of said side conveyors and adapted to travel along said hold, a swinging boom tripper on each of said side conveyors movable along the corresponding side conveyor and having a boom supported for swinging movement substantially horizontally either in an inboard direction or outboard direction, or in a direction along the corresponding side conveyor, and a belt conveyor on and along said boom in position to receive material from the corresponding side conveyor and carry it to the outer end of the boom.

14. In combination with a cargo vessel having a hold, a conveyor system for the vessel comprising a pair of side conveyors extending along the starboard and port sides respectively of the vessel and flanking the sides of the hold of the vessel, and an end conveyor extending across one end of the hold in transfer communication with said side conveyors at said end, said conveyors being operable in continuous sequential direction along one of said side conveyors, along said end conveyor and then along the other side conveyor, crane means for transferring bulk material selectively from said hold or from a point outside of said vessel to said one side conveyor, and means for transferring material from said other side conveyor selectively inboard into said hold or outboard outside of said vessel and selectively from different points along said other side conveyor.

15. The combination as described in claim 14, said means for transferring material from said other side conveyor comprising a conveyor movable bodily into position selectively inboard or outboard of said other side conveyor and movable along said other side conveyor.

16. The combination as described in claim 15, comprising a hopper car over said one side conveyor, movable along said one side conveyor for receiving the discharge from said crane means and located within the discharge range of said crane means in different positions of said hopper car along said one side conveyor.

References Cited in the file of this patent

UNITED STATES PATENTS

| | | |
|---|---|---|
| 871,469 | Bliedung | Nov. 19, 1907 |
| 1,335,455 | Stuart | Mar. 30, 1920 |
| 1,808,862 | Peterson | June 9, 1931 |
| 1,996,488 | Philips | Apr. 2, 1935 |
| 2,288,159 | Ernst | June 30, 1942 |
| 2,876,914 | Werner | Mar. 10, 1959 |